United States Patent
Hardy et al.

(10) Patent No.: US 9,346,565 B1
(45) Date of Patent: May 24, 2016

(54) NUCLEAR THERMAL PROPULSION ROCKET ENGINE

(71) Applicants: Richard Hardy, Henderson, NV (US); Jonathan Hardy, Normandy Park, WA (US)

(72) Inventors: Richard Hardy, Henderson, NV (US); Jonathan Hardy, Normandy Park, WA (US)

(*) Notice: Subject to any disclaimer, the term of this patent is extended or adjusted under 35 U.S.C. 154(b) by 0 days.

(21) Appl. No.: 14/851,665

(22) Filed: Sep. 11, 2015

Related U.S. Application Data (63) Continuation-in-part of application No. 14/692,349, filed on Apr. 21, 2015, now Pat. No. 9,180,985.

(51) Int. Cl.
| | |
|---|---|
| *F03H 99/00* | (2009.01) |
| *B64G 1/40* | (2006.01) |
| *G21D 5/02* | (2006.01) |
| *F02K 7/08* | (2006.01) |

(52) U.S. Cl.
CPC ............... *B64G 1/408* (2013.01); *B64G 1/409* (2013.01); *F02K 7/08* (2013.01); *G21D 5/02* (2013.01)

(58) Field of Classification Search
CPC ........... B64G 1/408; B64G 1/409; G21D 5/02
See application file for complete search history.

(56) References Cited

U.S. PATENT DOCUMENTS

| | | |
|---|---|---|
| 3,202,582 A | 8/1965 | Rom |
| 3,203,173 A | 8/1965 | Madey |
| 3,270,496 A | 9/1966 | Rom |
| 3,315,471 A | 4/1967 | Dailey et al. |
| 3,374,148 A | 3/1968 | Rom |
| 3,383,858 A | 5/1968 | Willinski et al. |
| 3,546,069 A | 12/1970 | McLafferty |
| 3,574,057 A | 4/1971 | Rom |
| 3,711,370 A | 1/1973 | Von Ohain et al. |
| 3,714,782 A | 2/1973 | Weinbaum et al. |
| 4,036,012 A | 7/1977 | Monsler |
| 4,121,971 A | 10/1978 | Marwick |
| 4,269,659 A | 5/1981 | Goldberg |

(Continued)

OTHER PUBLICATIONS

Ross, Shane, "Nuclear Thermal Rockets: The Physics of the Fission Reactor", Control and Dynamical Systems, Caltech, Pasadena, CA, Mar. 16, 2001, pp. 1-9.*

(Continued)

*Primary Examiner* — Lorne Meade
(74) *Attorney, Agent, or Firm* — R. Reams Goodloe, Jr.

(57) ABSTRACT

A nuclear thermal propulsion rocket engine. A reactor is provided to receive a fissionable fuel and a propellant fluid. Fuel may be transported and injected using a carrier fluid. Carrier fluid for fuel may be hydrogen or an isotope thereof. Fuel may be plutonium or selected actinide. A neutron generator is provided, and utilizes an ion generator and a target container which extends into the reactor to hold a target material therein. Neutrons may be emitted almost omni-directionally by impact of ions from the ion generator on target material. Cooling of the target container may be provided by a cooling sleeve that receives and circulates a cooling fluid, and discharges the cooling fluid after it has been heated. Fuel injectors provide fuel through fuel injector valves regulated to cycle on and off to pulse output power of the rocket engine, by timing frequency and duration of fuel feed, and regulating injected fuel amounts, to regulate the energy released over discrete time periods. The reactor receives reactants and an expandable propellant fluid such as hydrogen, and confines heated and pressurized gases for discharge out through a throat, and into a rocket engine expansion nozzle for propulsive discharge.

41 Claims, 8 Drawing Sheets

(56) References Cited

U.S. PATENT DOCUMENTS

| | | | |
|---|---|---|---|
| 4,401,618 A | | 8/1983 | Salisbury |
| 4,426,843 A | | 1/1984 | Fowler et al. |
| 4,666,678 A | * | 5/1987 | Lemelson ............... B21D 26/06 |
| | | | 204/157.61 |
| 4,802,639 A | | 2/1989 | Hardy et al. |
| H1501 H | | 11/1995 | Leyse |
| 5,475,722 A | * | 12/1995 | Culver ..................... G21D 5/02 |
| | | | 376/223 |
| 5,636,512 A | | 6/1997 | Culver |
| 5,873,239 A | * | 2/1999 | Culver ..................... G21D 5/02 |
| | | | 376/318 |
| 6,876,714 B2 | | 4/2005 | Rubbia |
| 9,180,985 B1 | * | 11/2015 | Hardy .................... B64G 1/408 |
| 2006/0126771 A1 | | 6/2006 | Da Conceicao |
| 2007/0127617 A1 | | 6/2007 | Sutherland |
| 2008/0232533 A1 | | 9/2008 | Blanovsky |
| 2009/0000268 A1 | | 1/2009 | Yurash |
| 2015/0098544 A1 | | 4/2015 | Blanovsky |

OTHER PUBLICATIONS

Robert W. Bussard. Concepts for Future Nuclear Rocket Propulsion, Jet Propulsion, Apr. 1958. (8 pages).

Frank E. Rom, Advanced Reactor Concepts for Nuclear Propulsion, Astronautics, vol. 4, No. 10, Oct. 1959 (pp. 20-22,46-50). *Appeared as reprint in Propulsion Techniques, Action and Reaction*, Peter J. Turchi, AIAA, 1998. (5 pages).

Franklin P. Durham, Solid-Core Nuclear Rocket Design, Astronautics, vol. 4, No. 10, Oct. 1959. (pp. 26,27,102-104). *Appeared as reprint in Propulsion Techniques, Action and Reaction*, Peter J. Turchi, AIAA, 1998. (4 pages).

Jerry Grey, Gaseous-Core Nuclear Rockets, Astronautics, vol. 4, No. 10, Oct. 1959. (pp. 23-25, 110-112). *Appeared as reprint in Propulsion Techniques, Action and Reaction*, Peter J. Turchi, AIAA, 1998. (5 pages).

Robert W. Bussard, Boundary Conditions for Nuclear Propulsion, Astronautics, vol. 4, No. 10, Oct. 1959. (pp. 28, 29, 119-122). *Appeared as reprint in Propulsion Techniques, Action and Reaction*, Peter J. Turchi, AIAA, 1998. (6 pages).

Robert W. Bussard, Nuclear Rocketry—The First Bright Hopes, Astronautics, vol. 7, No. 12, Dec. 1962. (pp. 32-35). *Appeared as reprint in Propulsion Techniques, Action and Reaction*, Peter J. Turchi, AIAA, 1998. (4 pages).

Ralph S. Cooper, Prospects for Advanced High-Thrust Nuclear Propulsion, Astronautics and Aeronautics, vol. 4, No. 1, Jan. 1966. (pp. 54-59). *Appeared as reprint in Propulsion Techniques, Action and Reaction*, Peter J. Turchi, AIAA, 1998. (6 pages).

Jerry Grey, Where the Carrot Does Not Improve Vision—Nuclear Energy for Space, Astronautics and Aeronautics, vol. 4, No. 3, Mar. 1966. (pp. 68-72). *Appeared as reprint in Propulsion Techniques, Action and Reaction*, Peter J. Turchi, AIAA, 1998. (4 pages).

R. W. Schroeder, Nerva—Entering a New Phase, Astronautics and Aeronautics, vol. 6, No. 5, May 1968. (pp. 42-53). *Appeared as reprint in Propulsion Techniques, Action and Reaction*, Peter J. Turchi, AIAA, 1998. (8 pages).

Robert G. Ragsdale and Edward A. Willis, Jr.,—Gas-Core Rocket Reactors—A New Look. NASA Technical Memorandum. N71-23907 (nasa tm X 67823). Technical Paper proposed for presentation at Seventh Propulsion Joint Specialist Conference sponsored by the American Institute of Aeronautics and Astronautics, Salt Lake City, Utah, Jun. 14-18, 1971. (18 pages).

Laurence H. Fishbach, Edward A. Willis. Performance Potential of Gas-Core and Fusion Rockets: A Mission Applications Survey. NASA Technical Memorandum. N71-37069 (NASA TM X-67940). Second Symposium on Uranium Plasmas: Research and Applications sponsored by the American Institute of Aeronautics and Astronautics. Atlanta, Georgia. Nov. 15, 1971. (18 pages).

Frank E. Rom, Russell C. Drew, What'S Holding Nuclear Propulsion Back? Astronautics and Aeronautics, vol. 10, No. 1, Jan. 1972. (pp. 62-64). *Appeared as reprint in Propulsion Techniques, Action and Reaction*, Peter J. Turchi, AIAA, 1998. (4 pages).

Charles L. Whitmarsh, Jr. Neutronics Analysis of an Open-Cycle High-Impulse Gas-Core Reacator Concept, Report No. E-6390. (NASA TM X 2534). Apr. 1972. (37 pages).

Stanley K. Borowski. Nuclear Propulsion—A Vital Technology for the Exploration of Mars and the Planets Beyond. Report No. E-4369 (NASA TM-101354). Jul. 18, 1987. (50 pages).

Gary L. Bennett, NASA Program Manager, Propulsion, Power and Energy Division, Office of Aeronautics, Exploration and Technology. NASA Headquarters, Washington, C.D. Paper—Nuclear Thermal Propulsion Program Overview (1990) (31 pages).

R. Zubrin. Nuclear Salt Water Rockets: High Thrust at 10,000 SEC ISP. Journal of the British Interplanetary Society. vol. 44. pp. 371-371. 1991-00-00. (6 pages).

Stanley K. Borowski and John S. Clark, Nuclear Thermal Rockets: Key to Moon-Mars Exploration, Aerospace America, vol. 30, No. 7, Jul. 1992. (pp. 34-37,48). *Appeared as reprint in Propulsion Techniques, Action and Reaction*, Peter J. Turchi, AIAA, 1998. (3 pages).

John S. Clark, U.S./CIS Eye Joint Nuclear Rocket Venture, Aerospace America, vol. 31, No. 7, Jul. 1993. (pp. 28-30,35). *Appeared as reprint in Propulsion Techniques, Action and Reaction*, Peter J. Turchi, AIAA, 1998. (3 pages).

Anthony C. Muscatello and Michael G. Houts. Surplus Weapons-Grade Plutonium—A Resource for Exploring and Terraforming Mars. The Case for Mars VI. University of Colorado, Boulder, Colorado. Jul. 17-20, 1996. (9 pages).

A.S. Cherkasov. Modern Problems of Nuclear Energetics. Kharkov National University, Ukraine. Sep. 25, 2001. (4 pages).

Timothy Lawrence. Nuclear Thermal Rocket Propulsion Systems. IAA White Paper. Department of Astronautics. Jan. 12, 2005. (18 pages).

Rodney E. Clark, Robert B. Sheldon. Dusty Plasma Based Fission Fragment Nuclear Reactor. Jul. 10, 2005. Grassmere Dynamics LLC, $41^{st}$ AIAA/ASME/SAE/ASEE Joint Propulsion Conference & Exhibit, Jul. 10-13, 2005, Tucson, AZ. (7 pages).

Michael G. Hoots, PhD. Space Nuclear Power and Propulsion, Report M15-4138. Oct. 16, 2014. (29 pages) NASA Technical Reports Server (NTRS). http://ntrs.nasa.gov/search.jsp?N=0&Ntk=All&Ntx=mode+matchallany&Ntt=M15-4138 Date Acquired by NTRS: Jan. 14, 2015. (Access Date: Mar. 17, 2015).

McNutt, Dr. Ralph L. A Realistic Interstellar Explorer, The Johns Hopkins University. Phase I Final Report, NASA Institute for Advanced Concepts. NIAC CP 98-01. Date of Submission: May 31, 1999; Reporting Month: May 1999 (60 pages).

Palaszewski, Bryan. High Power Electric and Advanced Space Propulsion: Making the Impossible Possible. Presented to the National Atomic Museum, Albuquerque, NM. NASA Glenn Research Center, Lewis Field, Feb. 19, 2005 (54 pages).

Neutron Generator, Wikipedia. (Aug. 24, 2015) https://en.wikipedia.org/wiki/Neutron_generator (7 pages).

http://en.wikipedia.org/wiki/Nuclear_thermal_rocket. Nuclear thermal rocket. From: Wikipedia, the free encyclopedia. (Access Date: Apr. 20, 2015) (12 pages).

RD-0410 http://www.astronautix.com/engines/rd0410.htmπmore. (Access Date: Mar. 17, 2015) (3 pages).

Nuclear/LH2 http://www.astronautix.com/props/nucarlh2.htm (Access Date: Mar. 17, 2015) (6 pages).

Thermal rocket—Wikipedia, the free encyclopedia. http://cn.wikipedia.org/wiki/Thermal_rocket. (Access Date: Mar. 17, 2015) (3 pages).

* cited by examiner

NUCLEAR THERMAL PROPULSION ROCKET ENGINE

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This application is a Continuation-In-Part of pending U.S. patent application Ser. No. 14/692,349, filed on Apr. 21, 2015 entitled NUCLEAR THERMAL PROPULSION ROCKET ENGINE, the disclosure of which is incorporated herein in its entirety, including its specification, drawing, and claims, by this reference.

TECHNICAL FIELD

This disclosure relates to rocket engines, and more specifically, to rocket engines which utilize nuclear fission as the source for thermal energy in the creation of motive force to create specific impulse sufficient for lifting objects to earth orbit, or for insertion into interplanetary flight.

BACKGROUND

A continuing interest exists for improvements in rocket engines, and more particularly for designs that would provide a significant increase in propulsive power, as often characterized by the benchmark of specific impulse, especially as might be compared to conventional chemically fueled rocket engines. Such new rocket engines might be useful in a variety of applications. Launch operational costs might be substantially reduced on a per pound of payload basis, by adoption of a new nuclear thermal propulsion rocket engine design that provides significant improvements in the specific impulse, as compared to existing prior art rocket engine designs. Further, from the point of view of overall mission costs, since the mass of most components of rocket vehicles are proportional to the mass of the propellant, it would be desirable to develop a new rocket engine design that reduces the mass of consumable components necessary for initiating lift off and acceleration to orbital velocity. Such an improvement would have a major impact on the entire field of rocket science from a launch weight to payload ratio basis. Such an efficiency improvement would also facilitate the inclusion of wings and recovery systems that would enable an economic fully reusable launch system with airliner type operations, for example, as described in U.S. Pat. No. 4,802,639, issued Feb. 7, 1989 to Richard Hardy et al., entitled HORIZONTAL TAKEOFF TRANSATMOSPHERIC LAUNCH SYSTEM, the disclosure of which is incorporated herein in its entirety by this reference. And, for missions beyond earth orbit, it would be advantageous, from the point of view of mission duration, to provide a new rocket engine design that reduces not only the payload to launch weight, but also the transit time to the mission objective, by providing high specific impulse, so as to minimize fuel required to achieve high vehicle velocities necessary to accomplish a selected interplanetary mission in a specific time frame. And, it would be desirable to provide such an improved rocket engine that includes components which have been reused and identified as comparatively reliable and cost effective, and thus, minimizes design risk and thus minimizes the extent of testing that may be necessary, as compared to many alternate designs which are subject to stress and strain from temperature and pressure in rocket engine services. Thus, it can be appreciated that it would be advantageous to provide a new, high efficiency rocket engine design which provides a high specific impulse, thus minimizing the launch weight to payload ratio.

In general, the efficiency of a rocket engine may be evaluated by the effective use of the consumable propellant, i.e. the amount of impulse produced per mass of propellant, which is itself proportional to the velocity of the gases leaving the rocket engine nozzle. In nuclear thermal rocket engine systems, the specific impulse increases as the square root of the temperature, and inversely as the square root of the molecular mass of the gases leaving the rocket engine nozzle. Consequently, in the design of a nuclear thermal rocket engine, efficiency is maximized by using the highest temperature available, given materials design constraints, and by utilizing a fluid that has a very low molecular mass for generation of thrust.

A variety of fission based rocket engines have been contemplated, and some have been tested. An overview of the current status of such efforts, and suggestions as to suitable configurations for various missions, was published on Oct. 16, 2014, at the Angelo State University Physics Colloquium in San Angelo, N. Mex., by Michael G. Houts, Ph.D, of the NASA Marshall Space Flight Center, Huntsville, Ala., in his presentation entitled Space Nuclear Power and Propulsion; available at website: ntrs.nasa.gov/search.jsp?R=20140016814. As he notes, the Rover/NERVA program (1955-1973) tested a fission rocket engine design. Further, the most powerful nuclear rocket engine that has been tested, to date, was the Phoebus 2a, which utilized a reactor that was operated at a power level of more than 4.0 million kilowatts, during 12 minutes of a 32 minute test firing. However, it is clear that the various nuclear fission rocket engine designs currently available have various drawbacks, such as excessive gamma radiation production of retained core components, which requires extensive and heavy shielding, if used on manned missions.

One of the more interesting disclosures of a fission based rocket engine was provided in U.S. Pat. No. 6,876,714 B2, issued on Apr. 5, 2005 to Carlo Rubbia, entitled DEVICE FOR HEATING GAS FROM A THIN LAYER OF NUCLEAR FUEL, AND SPACE ENGINE INCORPORATING SUCH DEVICE, the disclosure of which is incorporated herein in its entirety by this reference. That patent discloses the heating of hydrogen gas by fission fragments emitted from a thin film of fissile material, such as Americium metal or a compound thereof, which is deposited on an inner wall of a cooled chamber. However, that device generally describes the use of fissile material in critical mass conditions, and although it mentions the contemplation of sub-critical mass fission arrangements, details of such a condition are scant, if indeed present at all in the description thereof.

Thus, there remains a need to provide a design for a high specific impulse nuclear thermal propulsion rocket engine that simultaneously resolves two or more of the various practical problems, including (a) minimizing the weight of consumables (such as chemical fuel constituents) on a per payload pound basis; (b) avoiding excessive radiation shielding requirements when the design is used in manned missions, by avoiding use of retained radioactive hardware that generates large gamma ray emissions; (c) providing for power control, especially as related to power generation amounts at any given time, by providing for throttling of the fission reaction; and (d) providing a high specific impulse, as compared to prior art rocket engines for space vehicles.

SUMMARY

A novel fission based nuclear thermal propulsion rocket engine has been developed, which, in various embodiments, significantly enhances the specific impulse provided by the propulsion system. The rocket engine design provides source of fissionable material such as plutonium in a carrier gas such as deuterium. A neutron source is provided from a neutron beam generator. By way of engine design geometry, various embodiments may provide for intersection of a neutron beam from the neutron generator with the fissionable material injected by way of a carrier fluid into a reactor provided in the form of a reaction chamber. Impact of the neutron beam on the fissionable material results in a nuclear fission neutron generating reaction conditions in a reactor, resulting in release of heat energy to a propellant fluid such as hydrogen which is supplied to the reactor for heat expansion and discharge therefrom. The reactor is sized and shaped to receive the reactants and to receive an expandable fluid such as hydrogen, and to confine heated and pressurized gases for discharge out through a throat, into a rocket engine expansion nozzle for propulsive discharge therefrom. In an embodiment, a nuclear reaction may be provided in an intermittent, pulsed fashion, by intermittent engagement between a fissionable material and neutrons from a neutron beam generator. By control of frequency of the pulses of energy creation from the nuclear reaction, and by control of the amount of energy released per pulse, a workable reaction containment structure can be designed and maintained to withstand the high energy pulsed nuclear reactions, as well as to maintain a sufficiently cooled containment structure, to enable the rocket engine to work during sustained power operations as necessary for provide an energetic boost to a selected payload package.

An advantage of the novel nuclear thermal propulsion rocket engine design disclosed herein is that use of such a design in a second or later stage of a launch system would result in all radioactive fission products being exhausted into the vacuum of space.

Moreover, recent developments in neutron beam generators has made possible the development of a nuclear thermal rocket engine in which the process of production of neutrons can be partially separated from the process of absorption of neutrons by fissionable material, so that the fission process can be initiated and maintained while utilizing less than a critical mass of fissionable material. In this manner, a design has been developed in which radioactive fission products ejected out of the rocket nozzle into space with other exhaust gases, while amounts of fissionable material consumed are replenished with new fissionable material only as necessary to support continued fission, to obtain the necessary heat release for operation.

BRIEF DESCRIPTION OF THE DRAWING

The present invention(s) will be described by way of exemplary embodiments, using for illustration the accompanying drawing in which like reference numerals denote like elements, and in which:

FIG. 6 is similar to FIG. 1 above, showing a partial cross sectional view for an embodiment of an rocket engine, depicting a reaction chamber with a restrictive throat forming an outlet which leads to an expansion nozzle, and a neutron beam generator provides a beam of neutrons into the reaction chamber to intersect with actinides injected into the reaction chamber with a first fluid, and also showing injection of a second fluid which is provided to provide thrust for expansion due to heating in the reaction chamber, as well as diagrammatically depicting use of turbopumps on a common shaft or gear box for providing both a first fluid and a second fluid to the reaction chamber, and also having, driven by the same turbine system, an electrical generator for generating electrical power for supply to the neutron beam generator.

FIG. 7 is similar to FIG. 1 above, showing a partial cross sectional view for an embodiment of an rocket engine, depicting a reaction chamber with a restrictive throat forming an outlet which leads to an expansion nozzle, and a neutron beam generator provides a beam of neutrons into the reaction chamber to intersect with actinides injected via controlled frequency fuel injectors in a first fluid, and also showing injection of a second fluid which to be expanded and thereby to provide thrust due to heating in the reaction chamber, as well as diagrammatically depicting use of the second fluid as coolant for a target chamber and target material of the neutron beam generator, where a portion of the second fluid is discharged out through a perforated wall in the target chamber, so as to maintain inflow of additional coolant by continued supply of the second fluid.

The foregoing figures, being merely exemplary, contain various elements that may be present or omitted from a final configuration for an embodiment of a nuclear thermal rocket engine using nuclear reactions for power generation, or that may be implemented in various embodiments described herein for a rocket engine. Other variations in nuclear thermal rocket engine designs may use slightly different mechanical structures, mechanical arrangements, solid flow configurations, liquid flow configurations, or vapor flow configurations, and yet employ the principles described herein and as generally depicted in the drawing figures provided. An attempt has been made to draw the figures in a way that illustrates at least those elements that are significant for an understanding of exemplary nuclear thermal rocket engine designs under sub-critical mass fission conditions. Such details may be quite useful for providing propulsion for a high specific impulse space vehicle, and thus, reduce cost of payloads lifted to earth orbit, lunar, or interplanetary missions.

It should be understood that various features may be utilized in accord with the teachings hereof, as may be useful in different embodiments as useful for various sizes and shapes, and thrust requirements, depending upon the mission requirements, within the scope and coverage of the teachings herein as defined by the claims. Further, like features in various nuclear thermal rocket engine designs may be described using like reference numerals, or other like references, without further mention thereof.

DETAILED DESCRIPTION

Figure 1:
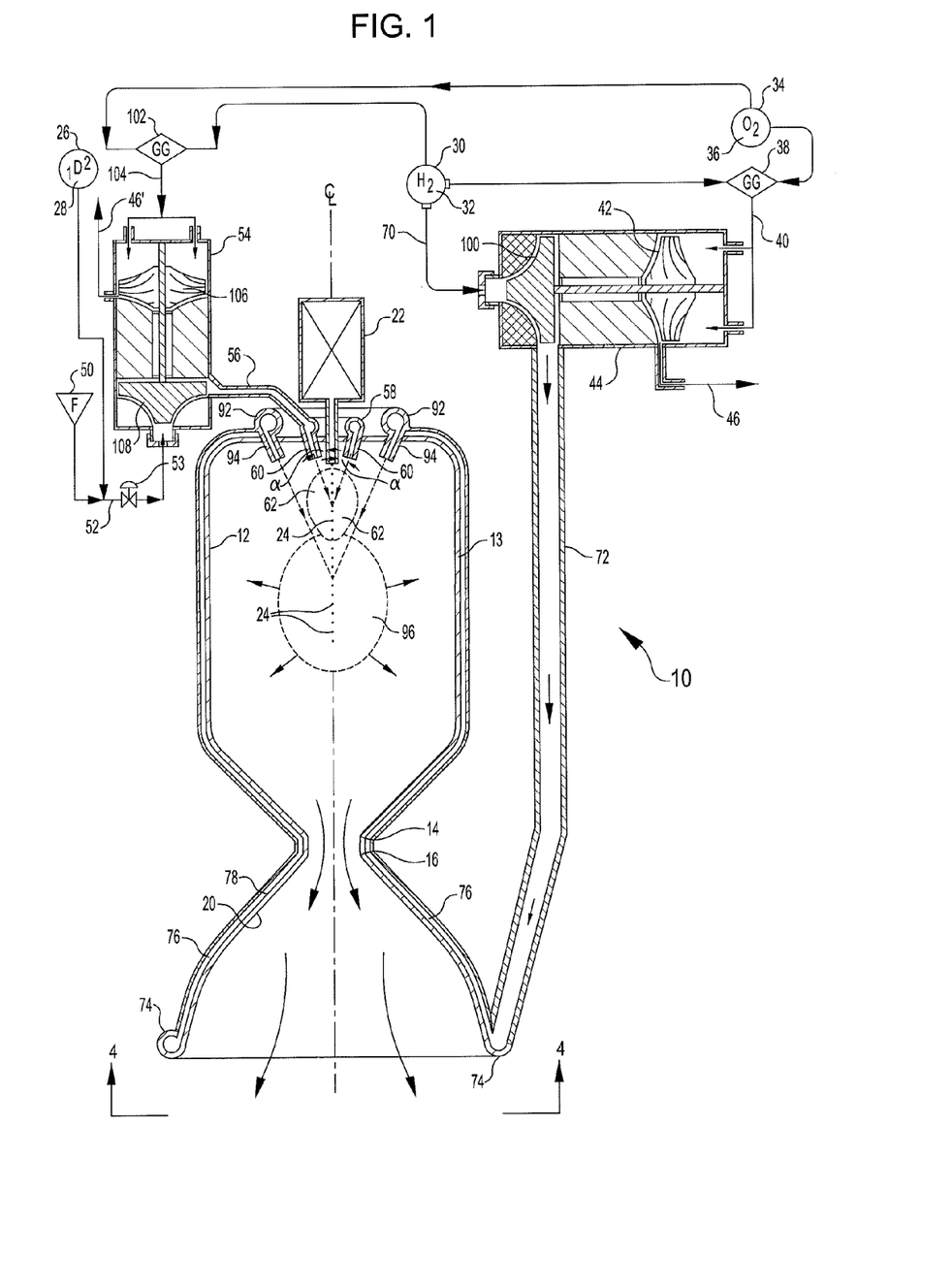
FIG. 1 is a partial cross sectional view for an embodiment of a rocket engine, showing a reactor in the form of a reaction chamber with a restrictive throat forming an outlet which leads to an expansion nozzle, and a neutron beam generator provides a beam of neutrons into the reactor to intersect with actinides injected into the reactor with a first fluid, and also showing injection of a second fluid which is provided to provide thrust for expansion due to heating in the reactor, as well as diagrammatically depicting turbopumps for providing both a first fluid and a second fluid to the reactor.
Figure 2:
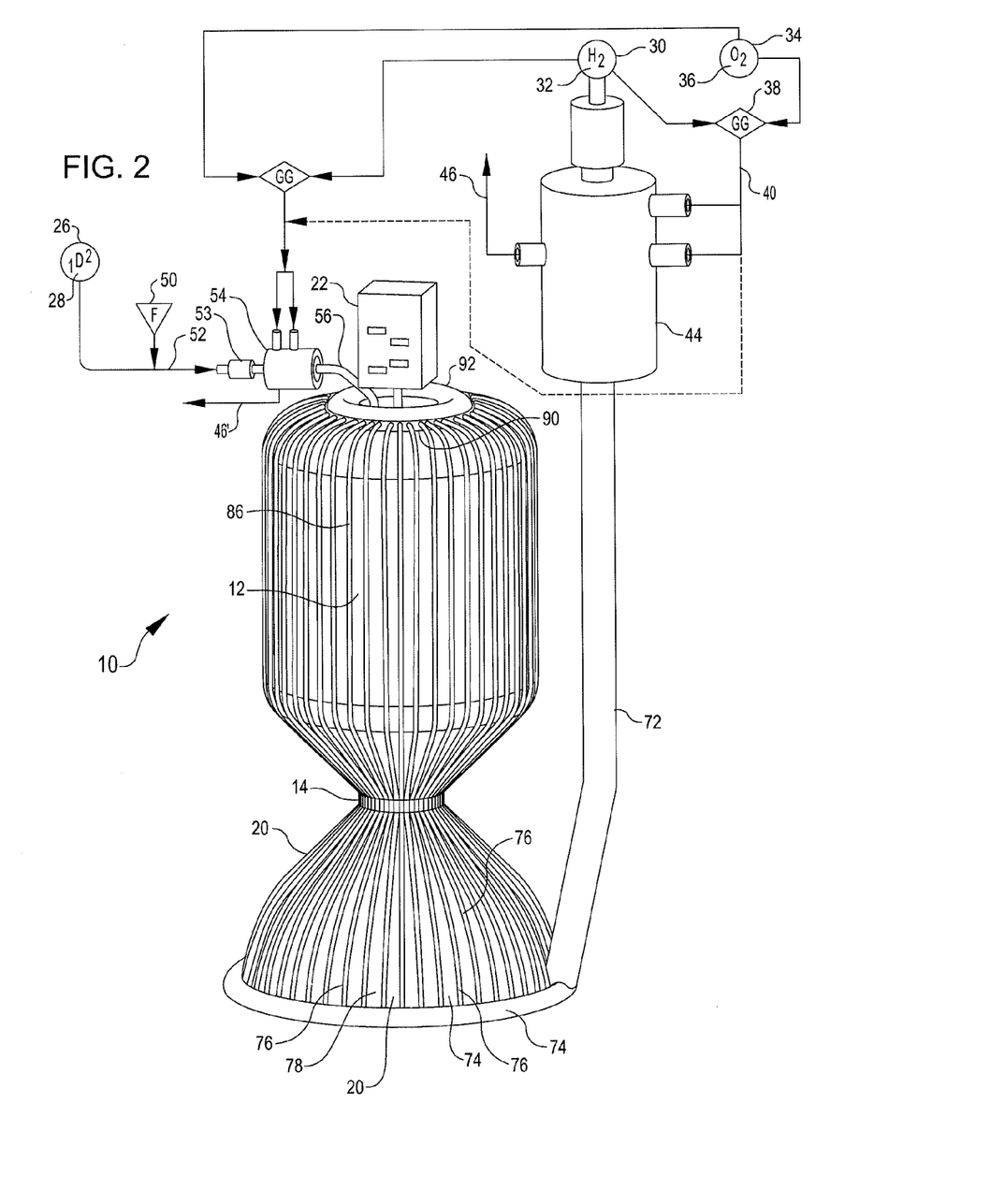
FIG. 2 is a partial perspective view for an embodiment of a rocket engine, showing the components just mentioned with respect to FIG. 1 above showing use of a neutron beam generator that provides a beam of neutrons into the reaction chamber to intersect with actinides injected into the reaction chamber with a first fluid, and also showing injection of a second fluid which is provided to provide thrust for expansion due to heating in the reaction chamber, as well as conceptually depicting turbopumps for providing both a first fluid and a second fluid to the reaction chamber, and also showing use of a gas generator for developing high pressure combustion gases for driving a fuel turbopump and a thrust fluid turbopump.

Attention is directed to FIGS. 1 and 2 of the drawing. FIG. 1 shows in a partial cross sectional view an embodiment for a nuclear thermal rocket engine 10, showing a reactor 12 having a tubular portion 13 and a restrictive throat 14 forming an outlet 16 which leads to an expansion nozzle 20. A neutron beam generator 22 is provided to direct a beam of neutrons 24 in the reactor 12. A first fluid storage compartment 26 for storage of a first fluid 28 such as deuterium (may be depicted as $_1D^2$ or as $^2H$) is provided. A second fluid storage compartment 30 is provided for storage of a second fluid 32 such as hydrogen $H_2$. A third fluid storage compartment 34 is provided for storage of third fluid 36 such as oxygen ($O_2$). In an embodiment, the third fluid 36 may be used for reaction with a second fluid 32 such as hydrogen ($H_2$) in a gas generator 38 (also marked as GG in FIGS. 1 and 2), to generate a high pressure fluid 40 (e.g., combustion gases) for driving a turbine 42 in a turbopump 44, as further discussed below. In such case, after pressure reduction through turbine 42, remaining low pressure water vapor may be discharged overboard as indicated by reference arrow 46.

A selected actinide fuel F which provides a fissile material may be supplied from storage container 50 for mixing with the first fluid 28. In an embodiment, a selected fuel F may be provided in a particulate form. In an embodiment, the selected fuel F may be provided in a very fine particulate, or more specifically, in a finely powdered form. In an embodiment, the powdered fuel may comprise a selected actinide compound. In an embodiment, the powdered fuel may comprise a substantially pure metallic actinide. In an embodiment, the fuel F may be supplied in a form including of one or more plutonium (Pu) isotopes. In an embodiment, the fuel F may be supplied in as a fissile material in the form of plutonium 239 ($^{239}Pu$). In an embodiment, the fuel F may be supplied as a fissile material in the form of uranium 235 ($^{235}U$). In various embodiments, the selected fissile material providing fuel F, before injection into the reactor 12, may be provided in particulate form.

In an embodiment, the first fluid 28 from the first fluid storage compartment 26 may be mixed with a selected amount of fuel F, before injection into reactor 12. In an embodiment, the first fluid 28 and a selected amount of fuel F may be mixed to create a rich fuel mixture 52, before passage of the rich fuel mixture 52 (i.e. a mixture of fuel F and first fluid 28) through control valve 53 and then into a fuel turbopump 54, which pumps the fuel rich mixture 52 into reactor 12 via fuel supply line 56, fuel header 58, and a first set of fuel injectors 60 which confine and direct passage of fuel rich mixture 52 into reactor 12. In an embodiment, control valve 53 may provide on-off capability. In various embodiments, control valve 53 may additionally provide throttling capability to regulate the quantity of flow of the rich fuel mixture 52. In an embodiment, at time of injection, the fuel rich mixture 52 may be in gaseous form, while carrying a particulate actinide fuel F therein. However, as shown in FIGS. 1 and 2, in various embodiments, at time of injection, the fuel rich mixture 52 may be in liquid form, while carrying a particulate actinide fuel F therein. In an embodiment, a first set of fuel injectors 60 may be oriented at a selected inwardly directed angle alpha ($\alpha$) that directs a rich fuel mixture 52 stream toward a reaction zone 62 wherein energetic neutrons 24 from neutron beam generator 22 collide with atoms of fissile material in fuel F as found in the rich fuel mixture 52, to cause fission of atoms of fuel F, with resultant heat release. In any event, a neutron beam generator 22, which is further discussed below, is configured to direct neutrons 24 to collide with at least some of the fuel F fissile material in the reaction zone 62, wherein the neutrons 24 and the fissile material interact to thereby effect fission of at least some of the atoms of the fissile material in fuel F and release heat.

In various embodiments, a rocket engine 10 may operate with fission of the fissile material of fuel F under sub-critical mass conditions. Under various embodiments, the fissile material may include plutonium 239. In an embodiment the amount of plutonium 239($^{239}Pu$) provided may be between about thirty parts per million (30 ppm) and about one hundred and twenty parts per million (120 ppm), by weight, in the first fluid 28. In an embodiment the amount of plutonium 239 ($^{239}Pu$) provided may be between about sixty parts per million (60 ppm) and ninety parts per million (90 ppm), by weight, in the first fluid 28. In an embodiment for a rocket engine, plutonium 239 ($^{239}Pu$) may be provided at about sixty parts per million (60 ppm), by weight, in the first fluid 28. In an embodiment for a rocket engine plutonium 239 ($^{239}Pu$) may be provided at up to about one thousand (1000) parts per million (1000 ppm), by weight, in the first fluid 28. In various embodiments for a rocket engine, plutonium 239 ($^{239}Pu$) may be provided at somewhere in the range from about ninety (90) parts per million (90 ppm) and about one thousand (1000) parts per million (1000 ppm), by weight. In an embodiment fissionable fuel F may be provided at somewhere in the range from about ninety (90) parts per million (90 ppm) and about one thousand (1000) parts per million (1000 ppm), by weight, depending on the efficiency at which the fuel F is consumed in the reactor 12. In various embodiments, the first fluid 28 may be provided as deuterium (may be shown as either $_1D^2$ or $^2H$). In an embodiment, the first fluid 28 may be provided as hydrogen ($H_2$).

In various embodiments, the first fluid 28 may include one or more isotopes of hydrogen. In an embodiment, the first fluid 28 may be primarily hydrogen. In an embodiment, the first fluid 28 may be essentially hydrogen. In an embodiment, the first fluid 28 may include deuterium. In an embodiment, the first fluid 28 may primarily be deuterium ($_1D^2$). In an embodiment the first fluid 28 may include essentially only deuterium ($_1D^2$). In an embodiment, the first fluid 28 may include at least some tritium ($_1T^3$). In an embodiment, the first fluid 28 may include both deuterium and tritium. In an embodiment, the presence of tritium may induce secondary fusion reactions in the center of the fluid flow while being directed out through the nozzle, thereby increasing specific impulse without significantly increasing engine wall temperature.

Figure 3:
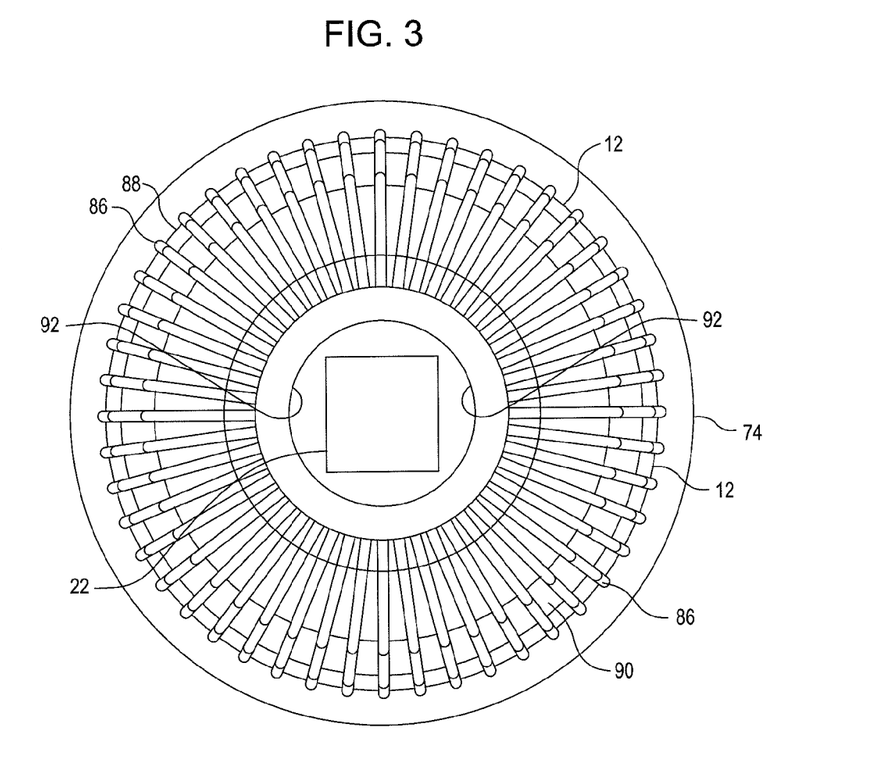
FIG. 3 is a top view of an embodiment for a reaction chamber, showing a location for a neutron beam generator, and also showing coolant passageways which run along the outer surface of the sides and top of the reaction chamber to a header which collects the heated second fluid and from which the second fluid is injected into the reaction chamber.
Figure 4:
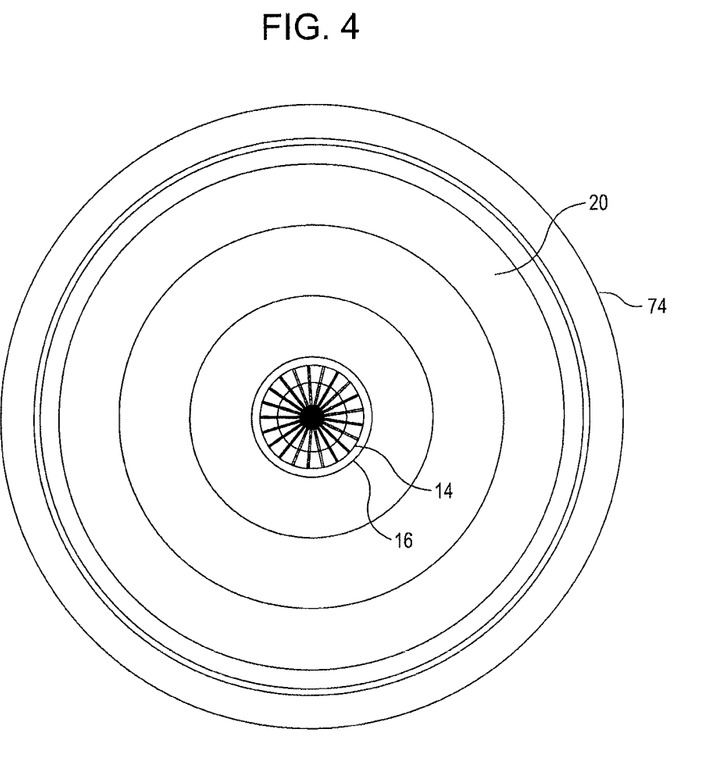
FIG. 4 is a bottom view of a an embodiment for a rocket engine, taken looking up at line 4-4 of FIG. 1, showing the second fluid distributor at the outlet of the expansion nozzle that is used to distribute the second fluid to coolant passageways along the walls of the expansion nozzle and the reaction chamber, and also showing the outlet of the reaction chamber.
Figure 5:
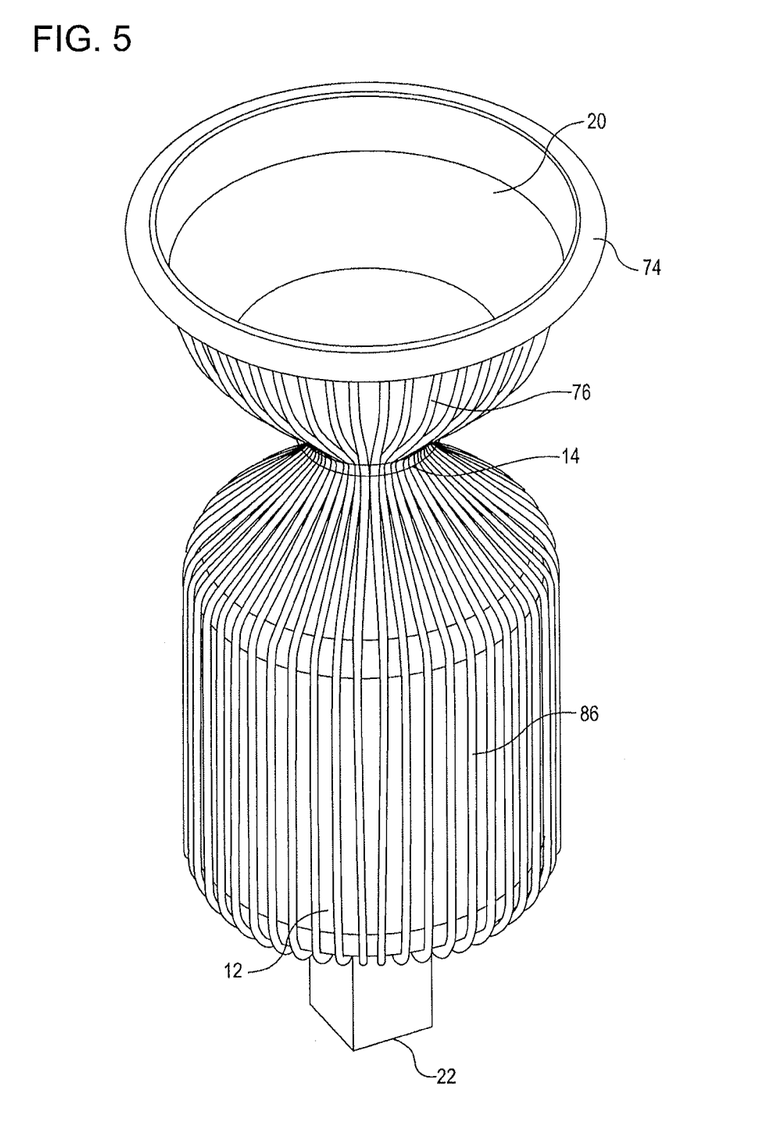
FIG. 5 is a perspective view of an embodiment for a rocket engine, showing a neutron beam generator mounted to a reaction chamber, and an expansion nozzle for receiving heated gases from the reaction chamber, as well as showing coolant passageways on outer surfaces of the reaction chamber and on the outer surfaces of the expansion nozzle.

To provide thrust, by way of heating and expansion in the reactor 12 and resultant expulsion out thru expansion nozzle 20, a low molecular weight fluid such as hydrogen ($H_2$) is provided as the second fluid 32. A second fluid 32 may be stored in a second fluid storage compartment 30, and on demand is delivered by line 70 to the thrust fluid turbopump 44. The thrust fluid turbopump 44 receives the second fluid 32 from the second fluid storage compartment 30 and provides (generally indirectly) the second fluid 32 under pressure to the reaction chamber 12. In an embodiment, the second fluid 32 may be send under pressure from thrust fluid turbopump 44 via second fluid supply line 72 to a distribution ring 74 located at or near the exit plane 77 of expansion nozzle 20. The second fluid 32 may be supplied via distribution ring 74 to nozzle coolant passageways 76 located on the exterior 78 of expansion nozzle 20. In this manner, an extremely cold fluid, e.g. liquid hydrogen, may be utilized as a coolant for the expansion nozzle by passage of the second fluid 32 through the nozzle coolant passageways 76. Likewise, as also seen in FIG. 3, the reactor 12 includes reactor coolant passageways 86 on the reactor external surface 88. In this manner, an extremely cold fluid, e.g. liquid hydrogen, is utilized as a coolant for the reactor 12 by passage of the second fluid 32 through the reactor coolant passageways 86. Thus, the rocket engine 10 may utilize the second fluid 32 as a coolant by way of the passage of second fluid 32 through the nozzle coolant passageways 76 and through the reactor coolant passageways 86, before injection of the second fluid 32 into the reactor 12.

Once second fluid 32 reaches the upper end 90 of reactor 12, a collection header 92 may be utilized to accumulate the second fluid 32 from the reactor coolant passageways 86. In an embodiment, from collection header 92, the second fluid 32 may be directed to a second set of injectors 94 which are configured for confining the passage of the second fluid 32 during injection into the reactor 12. By way of injectors 94, the second fluid 32 may be directed toward or injected into a mixing zone 96, which mixing zone 96 is located downstream of the reaction zone 62. In mixing zone 96, the second fluid 32 is heated and expanded, in order to provide thrust by ejection through throat 14 and outlet 16 of reactor 12. Also, the first fluid 28 is heated and expanded, in order to provide thrust by ejection through throat 14 and outlet 16 of reactor 12.

As mentioned above, in order to provide power for the thrust fluid turbopump 44, a gas generating chamber 38 may be provided to generate combustion products in the form of a hot gas 40 that drives a turbine 42, which in turn drives a pump impeller 100. Consequently, when oxygen 36 is supplied for combustion with hydrogen as second fluid 32, water vapor is formed, and the resultant low pressure water vapor stream 46 is discharged overboard. Likewise, hydrogen as second fluid 32 and oxygen 36 may be supplied to a second gas generating unit 102 to generate hot gas 104 that drives turbine 106 which in turn drives fuel pump impeller 108 in fuel turbopump 54.

Figure 6:
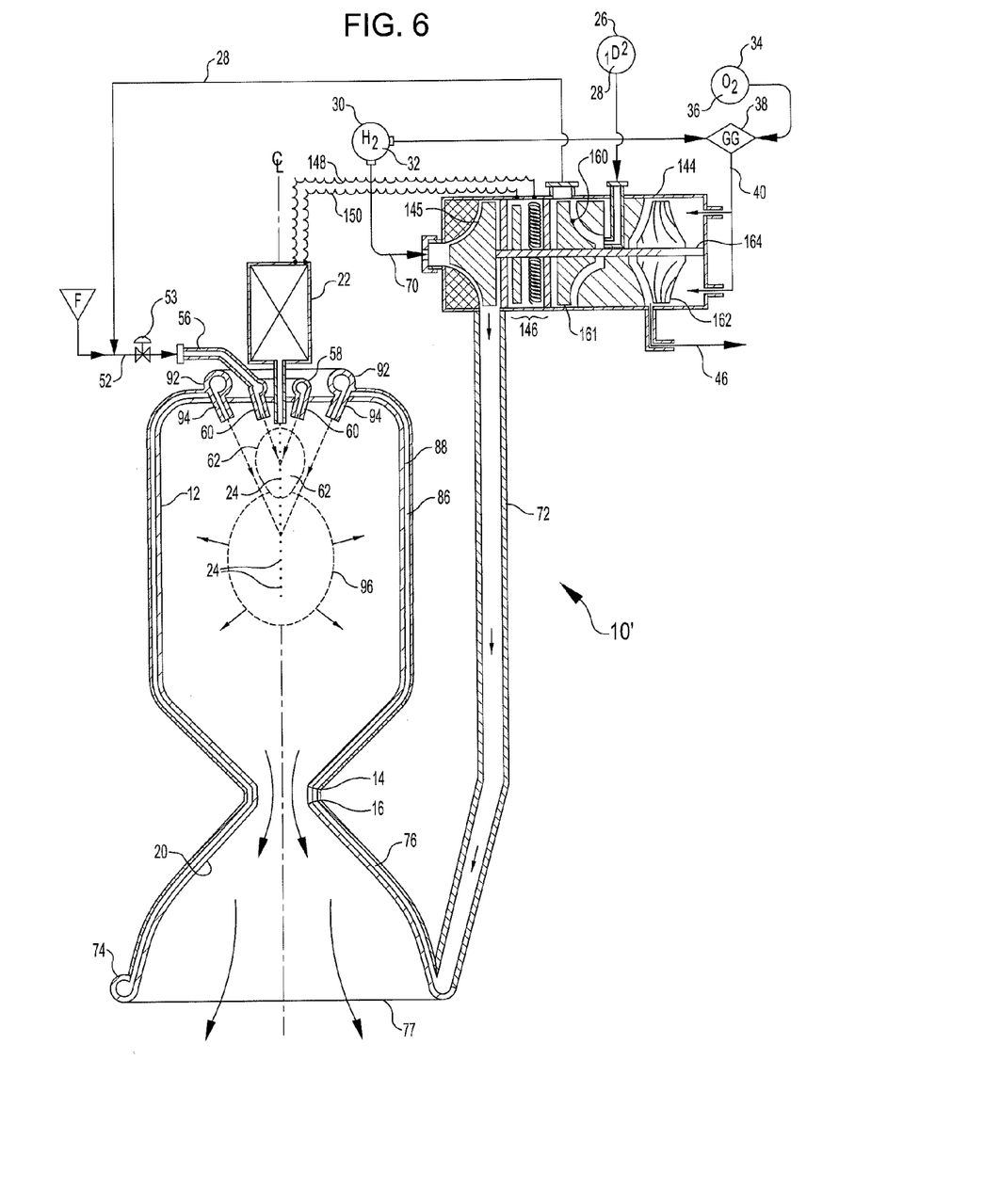

In another embodiment for rocket engine 10' as seen in FIG. 6, a different design for a thrust fuel turbopump 144 may be provided. In such design, the thrust fuel turbopump 144 may provide pumping of second fluid 32 by pump impeller 145, while also additionally providing an electrical generator 146. In an embodiment, the electrical generator 146 may be configured to generate electrical power, and supply the same via electrical power lines 148 and 150 to neutron beam generator 22. In an embodiment, a thrust fluid turbopump 144 may further include a fuel turbopump 160, for receiving first fluid 28 from the first fluid storage compartment 26 and providing the first fluid 28 under pressure to reactor 12. In an embodiment, the thrust fluid turbopump rotor 145, the fuel turbopump rotor 161, and the electrical generator 146 may all be driven by a gas turbine 162 on a common shaft 164 or via gearbox from a common shaft 164.

In various embodiments for a rocket engine 10, 10', 200, or the like, using nuclear thermal heating of a low molecular weight gas such as hydrogen as described herein, a rocket engine may be provided that has a specific impulse in excess of about 800 seconds. In various embodiments, specific impulse may be in the range of from about 800 to about 2500 seconds. In various embodiments using nuclear thermal heating of a low molecular weight gas such as hydrogen as described herein, a rocket engine may be provided that has a specific impulse in the range of from about 1000 to about 1215 seconds.

To summarize, in order to facilitate supply of hydrogen to the reactor 12 for heating, a thrust fluid turbopump 44 or 144 or the like may be provided as generally described herein above. In an embodiment, liquid hydrogen, i.e. a cryogenic liquid, may be provided to the rocket engine 10 or 10', by way of a thrust fluid turbopump that is driven by a turbine which is rotatably energized by high temperature gases. In an embodiment, the high temperature gases may be provided by way of combustion products, such as by way of combustion of hydrogen and oxygen in a gas generating chamber GG to generate a high temperature combustion gas, which after passage through the turbine 42 or 162, as the case may be, may be exhausted overboard in the form of a water vapor stream 46 or 46'. The tradeoff of loss of efficiency due to loss of propellant (hydrogen) expended in the gas generating chamber GG, in view of the usual weight savings and simplicity of design (and lack of radioactive contamination), as compared to additional weight and complexity in view of any additional specific impulse contribution in designs that might avoid such combustion losses, may be evaluated for a specific space vehicle design and attendant mission profile, as will be understood by those of skill in the art. Various configurations for drive of a suitable thrust fluid turbopump for feeding hydrogen to the reaction chamber may be provided by those of skill in the art using conventional liquid turbopump system design principles, and thus, it is unnecessary to provide such details. In general, the thrust fluid turbopump must avoid cavitation while pumping liquid hydrogen at relatively low inlet pressure, and deliver the hydrogen to the reaction chamber (and in an embodiment, via distribution ring and cooling passageways) at very high pressure, and preferably, with capability to provide a relatively wide throttling range. In various embodiments, the selected thrust fluid turbopump 44 or 144 design may be optimized for minimizing weight while providing necessary performance while at the same time minimizing the thrust fluid turbopump package size, in order to minimize necessary space in a selected space vehicle design. Selection of suitable bearing sand seals are of course necessary, and various design alternatives are known to those of skill in the art. More generally, those of skill in the art will understand that turbopumps for supply of cryogenic liquids to rocket engines require designs that provide maximum performance at minimum weight.

Similarly, to facilitate supply of the plutonium carrying deuterium gas to the reactor 12 for fission of at least some of the plutonium, a fuel turbopump 54 may be provided. In an embodiment, liquid deuterium i.e. a cryogenic liquid, may be provided to the rocket engine 10 or 10', by way of a fuel turbopump 54 or 160, that is driven by a turbine (106 or 162) which is rotatably energized by high temperature gases. In an embodiment, the high temperature gases may be provided by way of combustion products, such as by way of combustion of hydrogen and oxygen to generate a high temperature combustion gas. Various configurations for drive of a suitable fuel turbopump for feeding deuterium (and plutonium carried therewith) to the reaction chamber may be provided by those of skill in the art using conventional liquid turbopump system design principles, and thus, it is unnecessary to provide such details. In general, the fuel turbopump (54 or 160) must avoid cavitation while pumping liquid deuterium at relatively low inlet pressure, and deliver the deuterium to the reaction chamber at very high pressure, and preferably, with capability to provide a relatively wide throttling range. In various embodiments, the selected fuel turbopump design may be optimized for minimizing weight while providing necessary performance while at the same time minimizing fuel turbopump package size, in order to minimize necessary space in a selected space vehicle design.

Further, in order to generate electricity for a selected neutron beam generator 22, an electrical generator 146 may be combined with a turbopump 144, so that a hot gas driven turbine 162 in the turbopump 144 also provides shaft power for an electrical generator 146. In an embodiment, the high temperature gases may be provided by way of combustion products, such as by way of combustion of hydrogen and oxygen in a gas generating chamber GG to generate a high temperature combustion gas, which after passage through the gas turbine 162, may be exhausted overboard via a water vapor exhaust tube 46. Alternately, a stand-alone electrical turbine generator may be provided, with its own hydrogen gas or combustion gas driven turbine, in the manner as generally described above.

In an embodiment, a deuterium-deuterium ("DD") type neutron generator 22 may be utilized. As an example, high yield neutron generators are currently available for various applications with variable neutron output between $1\times10^{11}$ and $5\times10^{11}$ neutrons per second (n/s). It is an advantage of a DD type neutron generator design that because no tritium is utilized, radiation shielding and accompanying safety concerns and regulatory burdens are significantly reduced. Thus, such designs may be more suitable for manned space vehicles.

However, in an embodiment, a deuterium-tritium ("DT") type neutron generator may be utilized. As an example, extremely high yield neutron generators based on DT design principles are currently available with variable neutron output between $1\times10^{13}$ and $5\times10^{13}$ neutrons per second (n/s). Such designs may require appropriate shielding and regulatory approvals for manned spaceflight applications, but may be especially suitable for high payload unmanned spaceflight vehicle applications.

Neutron generators of either deuterium-deuterium design or of deuterium-tritium design have been developed by Phoenix Nuclear Labs, 2555 Industrial Drive, Monona, Wis. 53713, with a web page at phoenixnuclearlabs.com. Other vendors currently provide different designs. For example, Gradel Group, 6, Z.A.E. Triangle Vert, L-5691 ELLANGE-, Luxembourg (see website at gradel.lu/en/activities/neutrons-generators/products/14-1-mev-neutrons-dt/) currently provides a 14 MeV neutron generator of deuterium-tritium design, with basic functionality as follows:

It is currently anticipated that any selected neutron beam generator design may require adaptive configurations to various structures and components to make them suitable for the rigors of a rocket launch and subsequent spaceflight environment. However, the fundamental principles described herein for creation of a fission based rocket engine may be achieved by provision of a suitably adapted neutron beam generator device.

Figure 7:
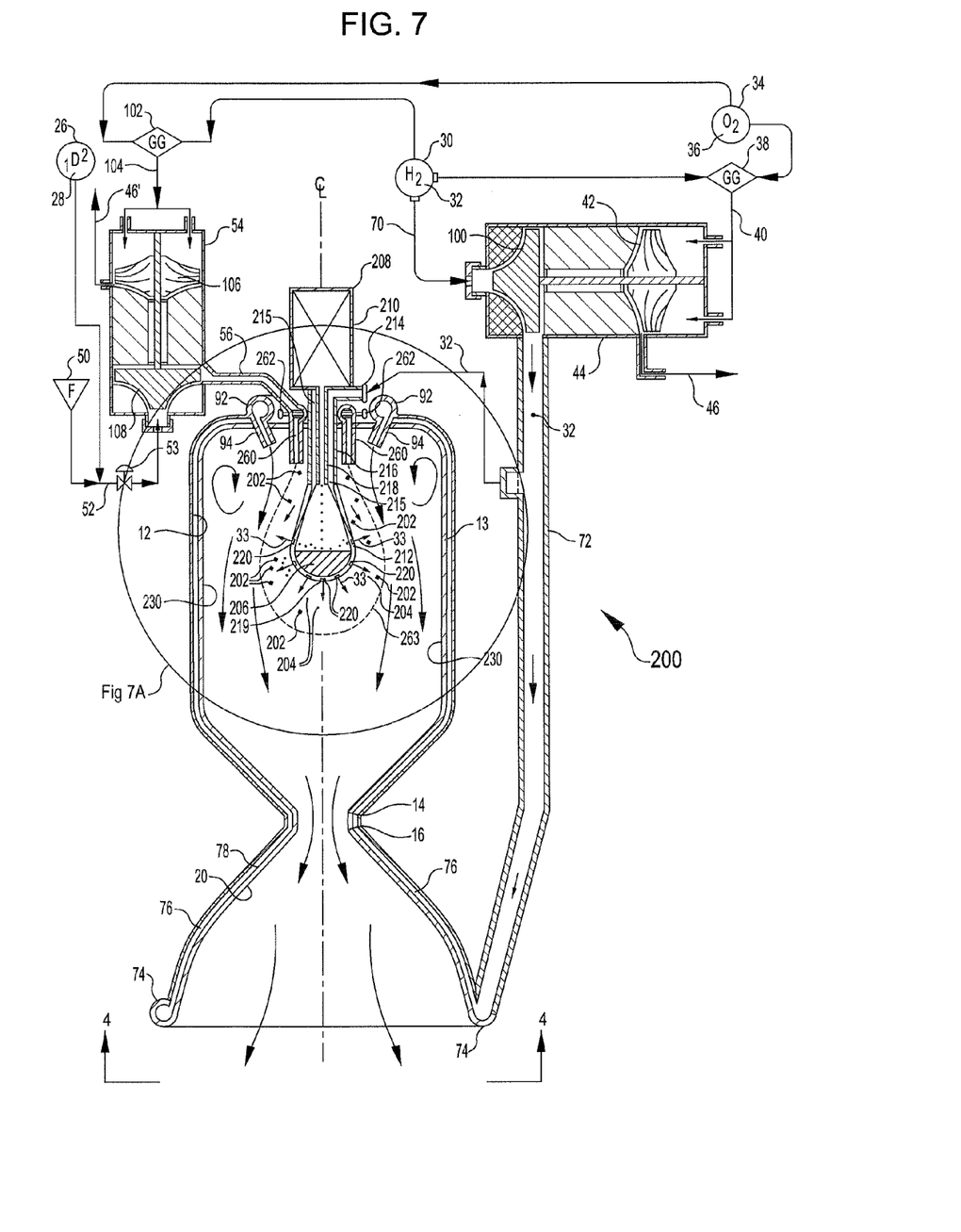
Figure 7A:
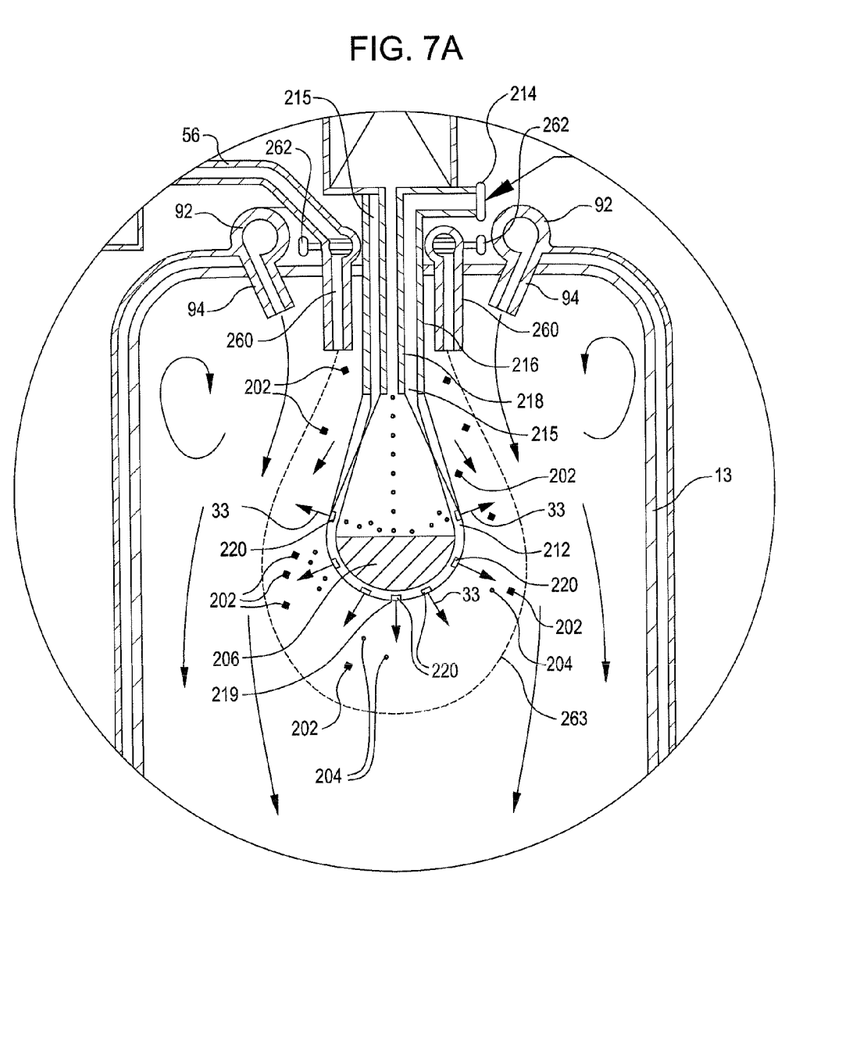

As a further example of adaptive design configurations for a neutron generator, attention is directed to FIG. 7, which provides details for an embodiment of a nuclear thermal rocket engine 200 which is configured for controlled pulse reaction between atoms of fissionable fuel F (diagrammatically depicted as diamonds 202 in FIG. 7) and neutrons 204 generated (omni-directional, in an embodiment) from target material 206 in neutron generator 208. In an embodiment, a neutron beam generator 208 may include a ion generator 210 and a target container 212 containing a target material 206. In an embodiment, a target container 212 may include a target container reactor portion which extends into the reactor 12. The neutron beam generator 208 is configured to accelerate ions, such as deuterium ions, or a combination of deuterium and tritium ions, toward the target material 206, normally containing deuterium. When deuterium is utilized for creation of an ion beam, two deuterium ions fuse, resulting in D-D type fusion. If tritium is used for creation of an ion beam, a deuterium and a tritium ion fuse, resulting in D-T fusion. In both cases, neutrons are the by-products of the fusion reaction. Various suitable target materials are known in the art for manufacture of neutron generators. One commonly utilized design technique for selection of a target material 206 is to use, or at least coat, a target material 206 with palladium or some other metal that readily forms hydrides, or since deuterium is used, deuterides. In an embodiment, a palladium coating might be used, since palladium may store nearly one deuterium atom for each palladium atom. However, a typical target material 206 may need to remain cool in order to maintain an acceptable density of deuterium target atoms, since excess heating may cause the actual targeted atoms for neutron generation to be desorbed from a metal target in which target atoms are initially saturated. In an embodiment, in order to cool the target container 212 and the target material 206 inside, second fluid 32 such as cryogenic hydrogen H2 may be utilized. In an embodiment a second fluid 32 such as cryogenic hydrogen H2 may be injected to header 214 and thence along a cooling passageway 215 defined by cooling sleeve 216 that houses an ion beam pathway 218. As shown in FIG. 7, the cooling sleeve 216 may have mounted at or near a distal end 219 a target material 206 in which target atoms (not shown) are contained. Cooling sleeve 216 may include outlets 220 from which second fluid 32 is ejected as a heated second fluid 33, thus allowing fresh cooling of the target material 206 via incoming cool second fluid 32, as may be supplied, in an embodiment, via turbopump 44. In an embodiment for a fifty thousand pound thrust engine, initial simulations have found that inserting the target material 206 a distance of about ten (10) inches down into the reactor 12 should be effective in producing millions of fissions using impacts with the fissionable fuel atoms 202. Neutron generation rates of $10^{11}$ neutrons per second, as may be produced from current technology deuterium-deuterium ("D-D") neutron generators would thus be sufficient to produce enough energy to power rocket engine 200. Further, manufacturers of neutron beam generators have indicated that $10^{13}$ neutrons per second should be obtainable with currently available technology. Consequently, a combination of $10^7$ fissions per neutron, and $10^{13}$ neutrons per second from a neutron generator, would be adequate to produce fission rates greater than about $10^{19}$ as required to produce specific impulses over 1000 seconds.

In order to maintain inner sidewalls 230 of reactor 12 at a structurally workable temperature, pulsed timing of nuclear reactions maybe desirable, so that the amount of energy released over a selected time interval does not exceed the capability of cooling of second fluid 32 (as expanded and heated from the nuclear reaction) when injected via second set of injectors 94 according to a selected injection, mixing, and thermal behavior profile. To pulse the release of energy from nuclear reactions, energetic neutrons and fissionable atoms in the fuel F may be brought together intermittently. In an embodiment, use of controllable fuel injectors 260 may be desirable. In an embodiment, one or more of the fuel injector valves 262 may be utilized to control an on-off supply of fuel rich mixture 52 (e.g., via line 56) to reactor 12. In an embodiment, one or more, or each of fuel injector valves 262 may be utilized for modulated control of supply of fuel rich mixture 52 (e.g., first fluid 28 having fuel F therein, via line 56) to reactor 12. By intermittent supply or by modulated supply of fissionable fuel F to reactor 12, the rate of energy release, and thus heating of propellant second fluid 32, e.g., hydrogen, as well as heating of adjacent components (such as target container 212 and inner sidewalls 230 of reactor 12) is controlled. Likewise, by adjusting the energy released in each pulse, the structural integrity (e.g, yield under stress/strain at high temperature) may be set at workable limits, which will of course depend on selected materials of construction and applicable design techniques for such structural materials.

As depicted in FIG. 7, in an embodiment, the first fluid 28 from the first fluid storage compartment 26 may be hydrogen ($H_2$). The first fluid 28 may be mixed with a selected amount of fuel F, before injection into reactor 12 via injectors 260. In an embodiment, the first fluid 28 and a selected amount of fuel F may be mixed to create a rich fuel mixture 52, before passage of the rich fuel mixture 52 (i.e. a mixture of fuel F and first fluid 28) through control valve 53 and then into a fuel turbopump 54, which pumps the fuel rich mixture 52 into reactor 12 via fuel supply line 56 through a fuel header 58 (not seen in FIG. 7 but functionally the same as shown and described above), and thru fuel injector valves 262 to a set of fuel injectors 260 which direct passage of fuel rich mixture 52 into reactor 12. In an embodiment, control valve 53 may provide on-off capability. In various embodiments, control valve 53 may additionally provide throttling capability to regulate the quantity of flow of the rich fuel mixture 52. In an embodiment, at time of injection, the fuel rich mixture 52 may be in gaseous form, while carrying a particulate actinide fuel F therein. However, as shown in FIGS. 1 and 2, in various embodiments, at time of injection, the fuel rich mixture 52 may be in liquid form, while carrying an actinide fuel F therein. In an embodiment, fuel injectors 260 may be oriented at a selected angle that directs a rich fuel mixture 52 stream toward a reaction zone 263 wherein energetic neutrons 204 from neutron beam generator 208 collide with atoms 202 of fissile material in fuel F as found in the rich fuel mixture 52, to cause fission of atoms 202 of fuel F, with resultant heat release.

In the foregoing description, for purposes of explanation, numerous details have been set forth in order to provide a thorough understanding of the disclosed exemplary embodiments for the design of a nuclear thermal rocket engine operable in sub-critical mass fissile conditions. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

It will be understood by persons skilled in the art that various embodiments for novel nuclear thermal rocket engine designs utilizing sub-critical mass fission of a selected actinide fissile material have been described herein only to an extent appropriate for such skilled persons to make and use such nuclear thermal rocket engine. Additional details may be worked out by those of skill in the art for a selected set of mission requirements and design criteria, such as whether the mission is manned or unmanned, (e.g., whether any necessary radiation minimization or radiation shielding may be required). Although only certain specific embodiments of the present invention have been shown and described, there is no intent to limit this invention by these embodiments. Rather, the invention is to be defined by the appended claims and their equivalents when taken in combination with the description.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Numerous modifications and variations are possible in light of the above teachings. Therefore, the protection afforded to this invention should be limited only by the claims set forth herein, and the legal equivalents thereof.

We claim:

1. A rocket engine, comprising:
a first fluid storage compartment for storage of a first fluid;
a second fluid storage compartment for storage of a second fluid;
a reactor, said reactor comprising
  (a) a chamber for containing said first fluid and said second fluid during heating,
  (b) a first set of injectors for (i) confining passage into said reactor of said first fluid received from said first fluid storage compartment, said first fluid containing at least some fissile material, and (ii) for injecting said first fluid containing at least some fissile material to a reaction zone in said reactor, (c) a second set of injectors for directing passage into said reactor of said second fluid received from said second fluid storage compartment;

(d) said reactor further comprising a mixing zone, and wherein said second fluid is injected into said reactor at said mixing zone, and (e) an outlet;

an expansion nozzle, said expansion nozzle connected to said outlet of said reactor;

a neutron beam generator, said neutron beam generator comprising an ion generator and a target container containing a target material, said target container extending into said reactor, said neutron beam generator configured to accelerate ions toward said target material to generate neutrons outwardly from said target material and collide with at least some of said fissile material in said reaction zone, wherein said neutrons and said fissile material interact to thereby effect fission of at least some of said fissile material and release heat; and wherein said first fluid and said second fluid are contained by and heated in said reaction chamber to produce a heated gas which is released through said outlet and then expelled through said expansion nozzle.

2. The rocket engine as set forth in claim 1, wherein said first fluid comprises hydrogen.

3. The rocket engine as set forth in claim 1, wherein said first fluid comprises deuterium.

4. The rocket engine as set forth in claim 1, wherein said first fluid comprises tritium.

5. The rocket engine as set forth in claim 1, wherein said first fluid comprises two or more isotopes of hydrogen.

6. The rocket engine as set forth in claim 1, wherein said second fluid comprises hydrogen.

7. The rocket engine as set forth in claim 1, wherein said fissile material comprises an actinide.

8. The rocket engine as set forth in claim 1, wherein said fissile material comprises one or more Pu isotopes.

9. The rocket engine as set forth in claim 8, wherein said fissile material comprises plutonium 239 ($^{239}$Pu).

10. The rocket engine as set forth in claim 7, wherein said actinide comprises uranium 235 ($^{235}$U).

11. The rocket engine as set forth in claim 1, wherein fission of said fissile material occurs under sub-critical mass conditions, and wherein said fissile material comprises $^{239}$Pu, and wherein said $^{239}$Pu is provided at about between thirty parts per million and one hundred and twenty parts per million, by weight, in said first fluid.

12. The rocket engine as set forth in claim 1, wherein fission of said fissile material occurs under sub-critical mass conditions, and wherein said fissile material comprises $^{239}$Pu, and wherein said $^{239}$Pu is provided at about between sixty parts per million, and ninety parts per million, by weight, in said first fluid.

13. The rocket engine as set forth in claim 1, wherein said fissile material comprises $^{239}$Pu, and wherein said $^{239}$Pu is provided at about between ninety parts per million, and one thousand parts per million, by weight, in said first fluid.

14. The rocket engine as set forth in claim 1, wherein said neutron generator comprises an ion beam pathway having a reactor portion that extends into said reactor, and wherein said target container includes a cooling sleeve that houses said ion beam pathway.

15. The rocket engine as set forth in claim 14, wherein said target container comprises a distal end, and wherein said cooling sleeve is coupled with said target container, to provide a housing for coolant for cooling said target container.

16. The rocket engine as set forth in claim 15, wherein said cooling sleeve comprises an outer wall having outlets therein, and wherein said outlets are configured to allow escape therethrough of a selected cooling fluid.

17. The rocket engine as set forth in claim 1, wherein one or more of said first set of injectors further comprises an injector control valve, said injector control valve sized and shaped for on-off control of passage of said first fluid therethrough.

18. The rocket engine as set forth in claim 1, wherein each of said first set of injectors further comprises an injector control valve, said injector control valve sized, shaped, and configured for modulated control of passage of said first fluid therethrough.

19. The rocket engine as set forth in claim 1, or in claim 17, wherein said rocket engine comprises a pulsed nuclear reaction engine.

20. The rocket engine as set forth in claim 19, wherein said injector control valve is operable to provide injection valve on and off cycle time selected to maintain heating and cooling of internal components of said reactor, so that materials of construction of said reactor are maintained within structurally operable parameters.

21. A rocket engine, comprising:

a first fluid storage compartment for storage of a first fluid;

a second fluid storage compartment for storage of a second fluid;

a reactor, said reactor comprising (a) a chamber for containing said first fluid and said second fluid during heating, (b) a first set of injectors configured to confine passage into said reactor of said first fluid, wherein one or more injectors in said first set of injectors further comprises an injector control valve that controls timing of injection of selected amounts of said first fluid into said chamber, said first fluid further comprising at least some fissile material at time of injection into said chamber;

(c) a second set of injectors for directing passage of said second fluid into said chamber for heating; and (d) an outlet;

a nozzle, said nozzle connected to said outlet of said reactor;

a neutron beam generator, said neutron beam generator comprising an ion generator and a target container containing target material, said target container extending into said chamber of said reactor, said neutron beam generator configured to accelerate ions toward said target material to generate neutrons outwardly from said target material, wherein neutrons collide with at least some of said fissile material in said chamber, wherein said neutrons and said fissile material interact to thereby effect fission of at least some of said fissile material and release heat; and wherein said first fluid and said second fluid are temporarily contained by and heated in said chamber to produce a heated gas which is released through said outlet and then expelled through said nozzle.

22. The rocket engine as set forth in claim 21, wherein said first fluid comprises hydrogen.

23. The rocket engine as set forth in claim 21, wherein said first fluid comprises deuterium.

24. The rocket engine as set forth in claim 21, wherein said first fluid comprises tritium.

25. The rocket engine as set forth in claim 21, wherein said first fluid comprises two or more isotopes of hydrogen.

26. The rocket engine as set forth in claim 21, wherein said second fluid comprises hydrogen.

27. The rocket engine as set forth in claim 21, wherein said fissile material comprises an actinide.

28. The rocket engine as set forth in claim 27, wherein said actinide comprises uranium 235 ($^{235}$U).

29. The rocket engine as set forth in claim 21, wherein said fissile material comprises one or more Pu isotopes.

30. The rocket engine as set forth in claim 21, wherein said fissile material comprises plutonium 239 ($^{239}$Pu).

31. The rocket engine as set forth in claim 21, wherein fission of said fissile material occurs under sub-critical mass conditions, and wherein said fissile material comprises $^{239}$Pu, and wherein said $^{239}$Pu is provided at about between thirty parts per million and one hundred and twenty parts per million, by weight, in said first fluid.

32. The rocket engine as set forth in claim 21, wherein fission of said fissile material occurs under sub-critical mass conditions, and wherein said fissile material comprises $^{239}$Pu, and wherein said $^{239}$Pu is provided at about between sixty parts per million, and ninety parts per million, by weight, in said first fluid.

33. The rocket engine as set forth in claim 21, wherein said fissile material comprises $^{239}$Pu, and wherein said $^{239}$Pu is provided at about between ninety parts per million, and one thousand parts per million, by weight, in said first fluid.

34. The rocket engine as set forth in claim 21, wherein said neutron generator comprises an ion beam pathway having a reactor portion that extends into said chamber of said reactor, and wherein said target container includes a cooling sleeve that houses said ion beam pathway.

35. The rocket engine as set forth in claim 34, wherein said target container comprises a distal end, and wherein said cooling sleeve is coupled with said target container, to provide a housing for coolant for cooling said target container.

36. The rocket engine as set forth in claim 34, wherein said cooling sleeve comprises an outer wall having outlets therein, and wherein said outlets are configured to allow escape therethrough of a selected cooling fluid.

37. The rocket engine as set forth in claim 21, wherein said injector control valve is sized shaped, and configured for on-off control of passage of said first fluid therethrough.

38. The rocket engine as set forth in claim 21, wherein said injector control valve is sized, shaped, and configured for modulated control of passage of said first fluid therethrough.

39. The rocket engine as set forth in claim 1, or in claim 37, or in claim 38, wherein said rocket engine comprises a pulsed nuclear reaction engine.

40. The rocket engine as set forth in claim 21, wherein said injector control valve is operable to provide (a) injector control valve on and off cycle times, or (b) injector control valve modulation cycles, or both, and wherein said injector control valve operation is configured to supply fissile material at a rate which avoids overheating of said reactor, so that materials of construction of said reactor are maintained within structurally operable parameters.

41. A method for operation of a rocket engine, comprising:
providing a first fluid storage compartment for storage of a first fluid;
providing a second fluid storage compartment for storage of a second fluid;
providing a reactor, said reactor comprising
a chamber for receiving and containing said first fluid and said second fluid during heating,
a first set of injectors configured to confine passage of said first fluid into said chamber, and further comprising an injector valve that controls timing of injection of selected amounts of said first fluid into said chamber, said first fluid further comprising at least some fissile material at time of injection into said chamber;
a second set of injectors for directing passage of said second fluid into said chamber for heating; and
(d) an outlet;
providing a nozzle, the nozzle connected to said outlet of said reactor;
providing a neutron beam generator,
injection the first fluid comprising at least some fissile material into the chamber;
generating neutrons with said neutron beam generator at a location proximate to the at least some fissile material injected into the chamber, to cause fission of at least some of said fissile material and generating heat;
heating said second fluid and said first fluid to provide a hot gas;
ejecting said hot gas out said nozzle to provide propulsive force between 800 seconds and 2500 seconds.

* * * * *